INVENTORS
WILLIAM D. WARNER AND
WILLIAM McFARLAND
BY
ATTORNEY

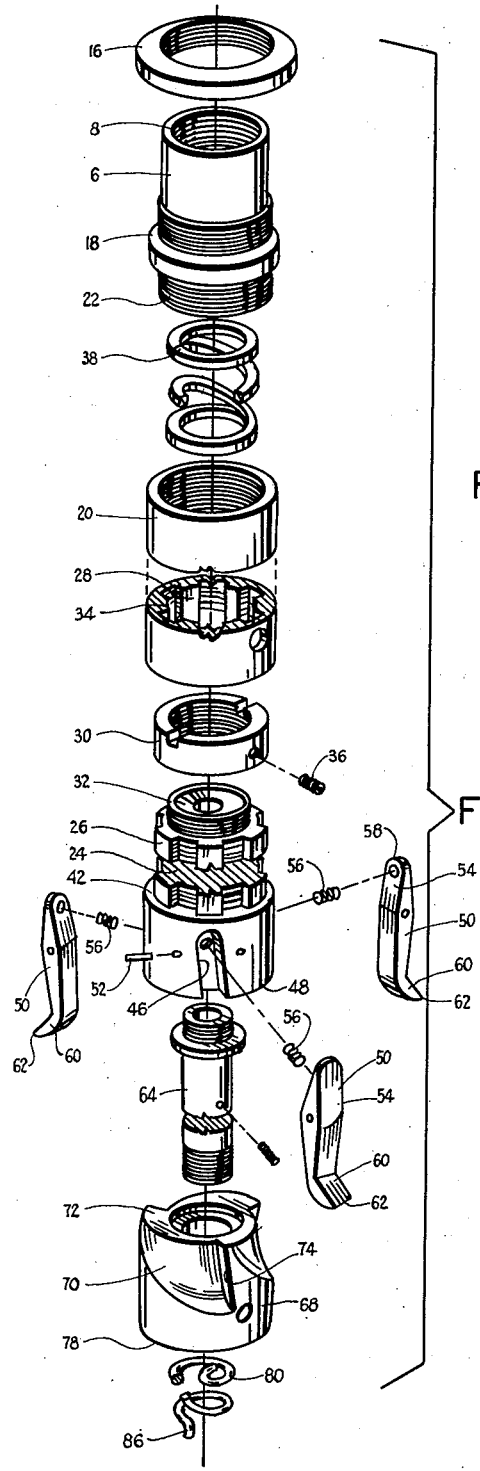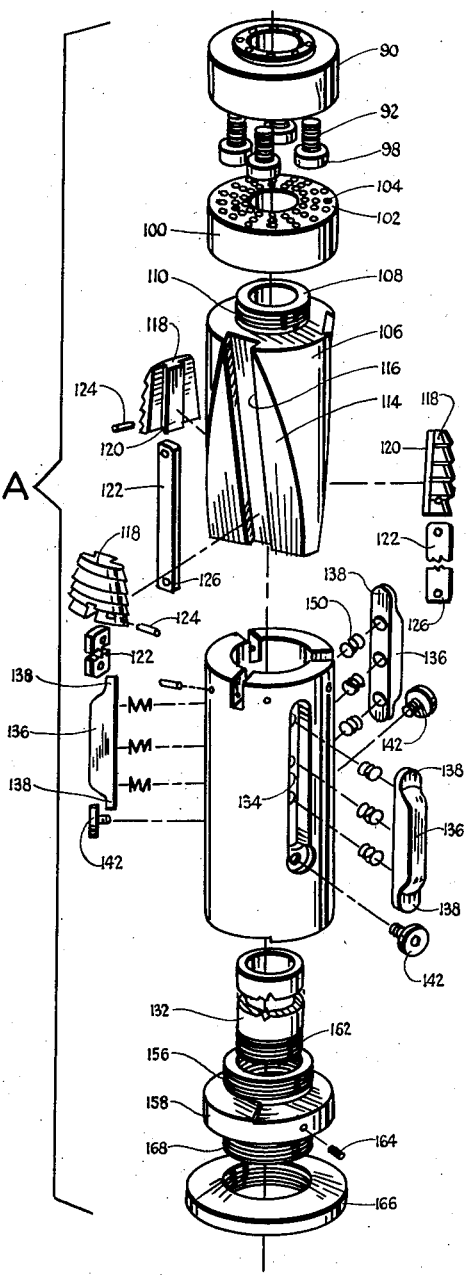

_United States Patent Office_

2,803,301
Patented Aug. 20, 1957

2,803,301

INSIDE CUTTER

William D. Warner and William McFarland,
Oklahoma City, Okla.

Application September 11, 1953, Serial No. 379,668

6 Claims. (Cl. 164—.7)

This invention relates to improvements in rotary cutting devices, and more particularly, but not by way of limitation, to an inside type cutting device for severing tubular objects.

In the operation of drilling and producing units for oil wells, it is frequently desirable to cut a pipe extending downwardly through the well (such as the well casing, for example) at a point intermediate of its ends. The usual procedure, when such an occasion arises, is to attach a cutting tool to the lower end of a string of smaller pipe, and lower the tool by this means downwardly through the pipe to be cut at the desired point. The smaller string of pipe is then manipulated from the surface to operate the cutting tool and sever the larger pipe.

Many types of such cutting tools have been devised. Generally speaking, they consists of an elongated sectional body having anchoring means incorporated in the lower section to secure the same in the desired position within the pipe to be cut. Another section of the tool is usually provided with radially expandable knives or cutting means to sever the larger pipe upon rotation of the knives. Various means have been designated to control both the expansion and rotation of the knives. In each instance, however, the knives are moved non-uniformly and have a tendency to bite suddenly into the pipe being cut, with resulting damage to the cutting tool and expensive replacement of the tool in the well bore.

The present invention contemplates a sectionally constructed inside cutting tool having novel means for yieldably operating its cutting knives. The knives are operated in such a manner to move outwardly in a uniform manner and progressively sever the pipe contacted thereby. The knife operating mechanism is constructed and arranged to preclude any sudden outward movement of the knives with the attendant undesirable biting effect. Also, the knife operating mechanism will not freeze upon undue exertion of force upon the mechanism by any inadvertence of the operator. In addition, we contemplate novel and efficient holding means for securing the cutter at the desired position in a pipe, and means for adapting the tool to various sizes of pipe.

An important object of this invention is to provide a novel inside cutting tool having means for uniformly expanding the cutting elements thereof.

Another object of this invention is to provide resilient operating means for the cutting elements of an inside cutting tool.

Another object of this invention is to provide a novel inside cutting tool wherein the cutting elements will not move suddenly or freeze in an extended position.

A further object of this invention is to adapt an inside cutting tool to various sizes of tubular objects.

A still further object of this invention is to provide an efficient and simply constructed inside cutting tool which may be economically manufactured.

Other objects and advantages of the invention will be evident from the following detailed description, read in conjunction with the accompanying drawings, which illustrate my invention.

In the drawings:

Figure 2 is an exploded view of the upper portion of the tool shown in Figs. 1 and 1A, illustrating the details of construction of the various parts.

Figure 2A is a continuation of Fig. 2, and illustrating the lower portion of the tool.

Figures 1, 1A:
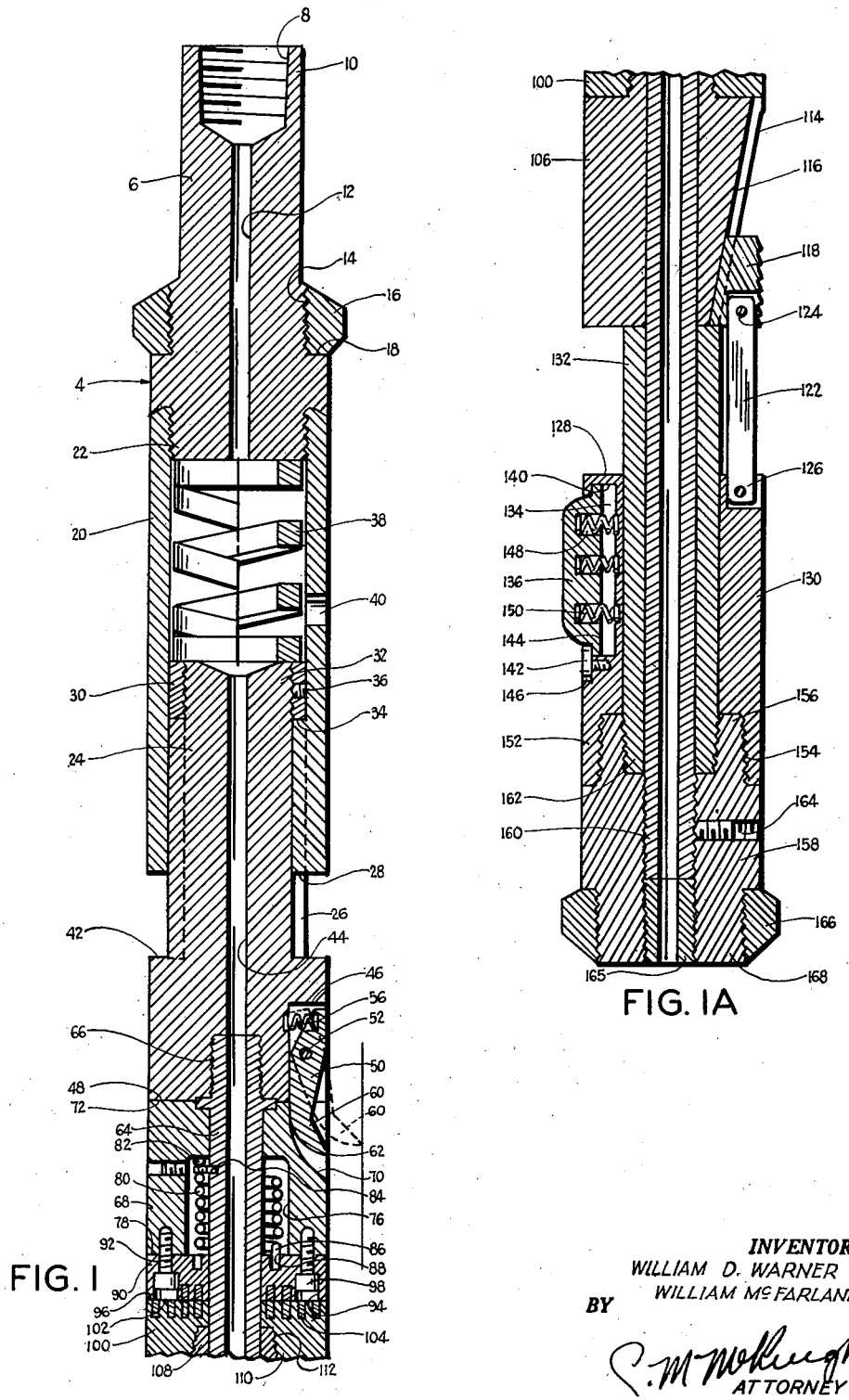
Figure 1 is a vertical sectional view of the upper portion of my novel inside cutting tool, in assembly.
Figure 1A is a continuation of Fig. 1, showing the lower portion of the tool.

Referring to the drawings in detail, and particularly Figs. 1 and 1A, reference character 4 generally indicates an inside cutter having an upper sub 6. Internal threads 8 are provided in the extreme upper end 10 of the sub 6 to facilitate connection of the inside cutter 4 to the lower end of a string of tubing or rods (not shown). Thus, the inside cutter 4 may be lowered into an oil well casing or the like (not shown) to sever the same as will be more fully hereinafter set forth. A longitudinal bore 12 is provided through the center of the upper sub 6 to accommodate flushing water. External threads 14 are provided on the medial portion of the upper sub 6 to receive a spacer ring 16. The spacer ring 16 aids in guiding the inside cutter 4 into the well casing or the like and maintains the cutter 4 in the proper transverse position in the well casing, as will be more fully hereinafter set forth. A circumferential shoulder 18 adjoins the external threads 14 at the lower end thereof to provide a stop for the spacer ring 16.

A tubular shaped member or sleeve 20 is threadedly connected to the lower end 22 of the upper sub 6 and extends downwardly therefrom. The sleeve 20 reciprocally receives a piston member 24. Complementary splines 26 and 28 are provided on the piston member 24 and in the lower portion of the sleeve 20, respectively, to prevent rotation of the piston member 24 independent of the sleeve 20. A spline nut 30, having an outer diameter substantially equal to the inner diameter of the sleeve 20, is threadedly secured to the upper end 32 of the piston member 24. The nut 30 is of a size to move within the sleeve 20, but is large enough to contact the upper ends 34 of the splines 28. Thus, the nut 30 limits the downward movement of the piston member 24 and prevents removal thereof from the sleeve 20. A suitable set screw 36 may be provided in the nut 30 to additionally secure the nut 30 to the piston member 24.

A helical actuating spring 38 is also provided in the sleeve 20 and is anchored at its opposite ends to the lower end 22 of the upper sub 6 and the upper end 32 of the piston member 24. The spring 38 constantly urges the piston member 24 downwardly for purposes as will be hereinafter set forth. A plurality of apertures 40 are provided in the medial portion of the sleeve 20 to provide a discharge of flushing liquid from the sleeve 20 and prevent any possible interference to the operation of the piston member 24.

The piston member 24 extends downwardly from the sleeve 20 and is provided with an upwardly facing circumferential shoulder 42 to limit the upward movement of the piston member 24 in the sleeve 20. A longitudinal bore 44 provides a fluid passageway through the center of the piston member 24. A plurality of substantially vertical slots 46 (see also Fig. 2) are provided in circumferentially spaced relation in the outer surface of the piston member 24 in communication with the lower end 48 thereof. The slots 46 extend at a slight angle to the vertical and any number may be provided, although only three are shown. Each slot 46 receives a knife or cutting element 50 pivotally secured therein by a transverse pin 52. The upper inner face 54 of each cutting element 50 is tapered outwardly to permit a pivotal movement of the element 50. A small helical spring 56 is disposed in the upper end of each slot 46 to constantly urge the upper end 58 of each cutting element 50 outwardly and thus retain the cutting elements 50 within the slots 46. Each cutting element 50 extends downwardly from its respective slot 46 and the lower end portion 60 thereof is bent outwardly with the lower extreme end 62 sharpened to provide a cutting edge as will be hereinafter set forth.

A tubular mandrel 64 is threadedly secured in a counter-bore 66 provided in the lower end of the bore 44, and extends downwardly from the piston member 24 throughout the remaining length of the inside cutter 4. A tubular knife block 68 is rotatably disposed on the mandrel 64 adjacent the lower end 48 of the piston member 24. A plurality of cam surfaces 70 are provided in the outer surface of the knife block 68 in communication with the upper end 72 thereof. A cam surface 70 is provided for each of the cutting elements 50 and has a substantially vertical shoulder 74 at one edge thereof. The depth of each cam surface 70 diminishes from the respective shoulder 74. Thus, when the knife block 68 is viewed from the upper end 72 thereof, each cam surface 70 diminishes in depth in a clockwise direction. In a non-operating position of the knife block 68, the cutting elements 50 extend into the deeper portion of their respective cam surfaces 70 adjacent the respective shoulders 74. In this position, the lower outer ends 62 of the cutting elements 50 will not extend outwardly beyond the outer surface of the knife block 68.

A counter-bore 76 is provided in the lower end 78 of the knife block 68 to receive a helical spring 80. The spring 80 surrounds the mandrel 64 and the upper end 82 thereof is secured to a transverse pin 84 extending outwardly from the mandrel 64. The lower end 86 of the spring 80 extends into a vertical aperture 88 provided in the upper face of a clutch thrust plate 90. The thrust plate 90 is annular shaped and is secured to the lower end 78 of the knife block 68 by a plurality of stud bolts 92. Suitable counter-bores 94 are provided in the lower face 96 of the thrust plate 90 for each stud bolt 92 to receive the heads 98 of the stud bolts. Thus, no portion of the bolts 92 will extend downwardly from the lower face 96 of the thrust plate 90.

A lower annular shaped clutch thrust plate 100 surrounds the mandrel 64 immediately below the thrust plate 90. The upper face 102 of the lower thrust plate 100 and the lower face 96 of the thrust plate 90 are ordinarily in contacting relation and are provided with studs 104 formed out of copper or any other suitable non-friction metal. In addition, these contacting faces are provided with a machine finish to provide a suitable clutching action as will be more fully hereinafter set forth.

A slip shoe 106 (see Figs. 1A and 2A) is rotatably disposed on the mandrel 64 immediately below the thrust plates 90 and 100. The upper end 108 of the slip shoe 106 is reduced in diameter and provided with external threads 110 for connection with internal threads 112 in the lower portion of the lower thrust plate 100. A plurality of circumferentially spaced tapered surfaces 114 are provided on the slip shoe 106 throughout the length thereof. The surfaces 114 are tapered upwardly and outwardly and each is provided with a dove tail groove 116 extending the length thereof. Serrated slips 118, having projections 120 formed to mate with the dove tail grooves 116, are disposed on each of the tapered surfaces 114. The projections 120 and grooves 116 cooperate to prevent lateral movement of the slips 118 and guide the slips 118 in a vertical direction as will be more fully hereinafter set forth. A link 122 is secured to the lower end of each slip 118 by a transverse pin 124 and extends downwardly therefrom parallel to the mandrel 64. The lower end 126 of each link 122 is pinned to the upper end 128 of a wiper block 130.

The wiper block 130 is tubular in shape and is rotatably disposed on a bottom sleeve 132 which in turn is disposed on the mandrel 64. A plurality of circumferentially spaced vertical slots 134 are provided in the outer surface of the wiper block 130. Each slot 134 receives a wiper 136 having reduced end portions 138. The upper end 140 of each slot 134 is under cut as clearly shown in Fig. 1A to receive the respective wiper block end 138 and limit the outward movement of the wiper 136. A large headed screw 142 is secured in the wiper block 130 adjacent the lower end 144 of each slot 134 to engage the respective wiper block end 138 in a similar manner. Counter-bores 146 are provided in the wiper block 130 around each screw 142 in order that the heads of the screws 142 may be flush with the outer surface of the wiper block 130. A plurality of vertically spaced circular recesses 148 are provided in the inner face of each wiper 136 to receive helical springs 150. The springs 150 extend into contact with the inner edges of the slots 134 and constantly urge the wipers 136 outwardly for purposes as will be hereinafter set forth.

The lower end 152 of the wiper block 130 is counter-bored and provided with right hand threads at 154 to receive the upper threaded end 156 of a bottom nut 158. The bottom nut 158 is also threadedly secured to the lower end 160 of the mandrel 64 and the lower end 162 of the bottom sleeve 132. A suitable set screw 164 may be provided in the medial portion of the bottom nut 158 to assist securing the nut 158 to the mandrel 64. Also, a tubular nut 165 is threaded and preferably welded in the lower portion of the bottom nut 158 to contact the lower end 160 of the mandrel 64 and properly position the bottom nut 158. A lower spacer ring 166 is threadedly secured on the lower end 168 of the bottom nut 158 and assists in aligning the cutter 4 as will be hereinafter set forth.

*Operation*

To provide the inside cutter 4 for operation, it is assembled as shown in Figs. 1 and 1A and is secured on the lower end of a string of tubing or the like (not shown) by means of the threads 8 in the upper sub 6. The cutter 4 is then lowered in the well casing or other tubing to be cut (not shown) by means of the aforementioned string of tubing. As the cutter 4 moves downwardly through the well casing, the spacer rings 16 and 166 slide along the inner walls of the casing and retain the cutter 4 concentrically therein. In addition, the wipers 136 will slide along the inner walls of the casing, but will not provide an excessive amount of resistance to the downward movement of the cutter 4.

When the cutter 4 reaches the desired position in the well casing, the supporting string of tubing is rotated in a counterclockwise direction from the surface of the well. This rotative movement is transmitted from the string of supporting tubing through the upper sub 6, splined sleeve 20 and piston member 24, and mandrel 64 to the bottom nut 158. The wipers 136, being in contact with the inner walls of the well casing, will prevent rotative movement of the wiper block 130. Therefore, the right hand threads 154, interconnecting the bottom nut 158 to the wiper block 130, will be disconnected and the bottom nut 158 will be moved downwardly from the wiper block 130. Upon disconnection of the bottom nut 158 and wiper block 130, the supporting string is moved further downward to move the mandrel 64 and bottom sleeve 132 downwardly through the disconnected wiper block 130. Thus, as the supporting string is moved downward the links 122 connected to the anchor wiper block, will move the slips 118 relatively upward over the tapered surfaces 114. The slips 118 are thereby moved upwardly and outwardly into contact with the inner walls of the well casing to retain the slip shoe 106 and lower thrust plate 100 in a fixed position in the well casing.

The cutter 4 is then in position and ready for severing the well casing. To accomplish this operation, the string of supporting tubing (not shown) is rotated in a clockwise direction from the surface of the well. This rotative movement is transmitted through the upper sub 6 to the splined sleeve 20 and piston member 24, and knife block 68, as well as the mandrel 64. During this rotative movement, the actuating spring 38 presses downwardly on the piston member 24 and knife block 68 to provide a friction brake between the thrust plates 90 and 100. Since the thrust plate 100 is held stationary, a drag will be imposed upon the upper thrust plate 90 and knife block 68 to provide relative rotative movement between the knife block 68 and piston member 24. The cutting elements 50 will, of course, be rotating simultaneously with the piston member 24. This relative rotative movement will cause a clockwise movement of the cutting elements 50 over the cam surfaces 70 to pivot the lower ends 62 of the cutting elements 50 outwardly into contact with the inner walls of the well casing, as shown by the dotted lines in Fig. 1. Thus, the cutting edges 62 of the knives 50 will move in a circle in contact with the inner walls of the well casing and provide an annular cut in the well casing.

During the cutting action of the knives 50, the actuating spring 38 will maintain a substantially constant downward pressure upon the thrust plates 90 and 100 to provide a uniform and progressive outward movement of the knives 50. It will thus be seen that the slips 118 hold the slip shoes 106 stationary which in turn holds the bottom thrust plate 100 stationary. Consequently as the pressure of the spring 38 acts through the piston 24 against the knife block 68 during rotation of the tubing string, there is sufficient pressure of the upper thrust plate 90 against the lower thrust plate 100 to provide a friction brake and cause the knife block 68 to be held substantially stationary with respect to the rotating piston 42 carrying the pivotal knives 50. In this manner the knives are moved through the cam grooves 70 from the deeper to the more shallow portions directing the knives 50 into a biting contact with the inner periphery of the casing to be cut. It will be apparent in this position of engagement with the casing, the knives are limited in their outward radial movement, and also the shallow portion of the groove 70 limits their rotative movement with respect to the knife block, consequently providing enough force through the continued rotation of the tubing string to overcome the friction brake between the thrust plates 90 and 100 and thereby providing a slipping action of the knife block 68. It will thus be seen that the knives 50 are moved uniformly through the grooves 70 until contact with the pipe during which time the knife block 68 is held substantially stationary by the friction plates 90 and 100. The downward pressure of the spring 38 assists this operation. During the entire cutting operation no excessive or instantaneous pressure is imposed upon the thrust plates 90 and 100 to cause a grabbing or biting action of the knives 50. The complete cutting action is accomplished smoothly, and if outward movement of the knives 50 is resisted, as by the knives 50 encountering excessively hard metal, the upper thrust plate 90 will slide over the lower thrust plate 100 to provide uniform movement of the knife block 68 and piston member 24. The resilient action of the actuating spring 38 thus provides a uniform outward movement of the knives 50, but does not continue forcing the knives 50 outwardly when excessive resistance is encountered.

When the well casing has been severed, the rotative movement of the cutter 4 is stopped. At this time the retraction spring 80 co-acts with the mandrel 64, through the medium of the stud 84, to move the upper thrust plate 90 and knife block 68 in a counterclockwise direction. Simultaneously, the small helical springs 56 will be urging the lower portions of the cutting elements 50 into contact with the cam surfaces 70. As the knife block 68 is rotated counter-clockwise by the spring 80 with respect to the piston member 24, the lower portions of the cutting elements 50 will move into the deeper portions of the cam surfaces 70 into contact with the shoulders 74. Thus, the cutting elements 50 will be completely retracted into the area of the knife block 68. The supporting string of tubing may then be raised to remove the cutter 4 from the well casing.

During the initial upward movement of the cutter 4, the wipers 136 will retain the wiper block 130 in a fixed position. The slips 118 will thereby be moved relatively downward over the tapered surfaces 114 and be disengaged from the well casing. The cutter 4 is then freed for removal from the well casing.

From the foregoing, it is apparent that the present invention provides a novel inside cutting tool for severing tubular objects. The cutting elements are operated by a resiliently actuated clutch mechanism whereby the cutting elements are moved outwardly for the cutting action in a uniform manner to progressively sever the tubular object. The knife actuating mechanism precludes any sudden outward movement of the knives and precludes a freezing of the knives upon any undue exertion of force by the operator of the tool. Also, the present invention provides novel and efficient anchoring means for securing the tool in the desired position and means for attaching and retaining the tool concentrically in the object to be severed.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. An inside cutting tool for severing tubular objects, comprising an elongated sectional body, said sections being rotatable relative to each other, clamping means on one of the body sections for securing said section to the inner walls of the tubular object, a plurality of cutting elements pivotally secured to the second body section in a normally radially retracted position, a knife block in said second section rotatable with respect to the remainder of said section and having cam surfaces thereon cooperating with said cutting elements upon rotation thereof relative to the remainder of the second body section for moving the cutting elements radially outward, contacting nonfrictional plates disposed on opposed portions of the knife block and first body section, and resilient means in the second body section constantly urging said non-friction plates together for permitting relative rotation between said knife block and the remainder of said second body section.

2. An inside cutter for severing tubular objects, comprising an elongated body of a size to be inserted in said object, a sleeve in the upper portion of said body, a piston member reciprocally disposed in said sleeve and extending downwardly therefrom, a spring in said sleeve constantly urging said piston member downwardly, a cam block carried by said piston member and rotatable thereon, a plurality of cutting elements pivotally carried by said piston member and moved radially outward by said cam block upon relative rotation between the cam block and the cutting elements, an anchoring section rotatably carried by said piston member adjacent said cam block, clamping means on said anchoring section adapted to engage the inner walls of said object, and non-friction clutch means between said cam block and said anchoring section for applying a drag on said cam block upon rotation of said body, whereby said cutting elements will pivot outwardly and sever the tubular object.

3. An inside cutting tool for severing tubular objects, comprising an elongated body of a size to be inserted in the tubular object, clamping means on the body for securing thereof within the tubular object, mandrel means extending into the upper portion of said body and reciprocable therein, spring means provided in said body for constantly urging said mandrel means in one direction, a cam block on said mandrel means and rotatable thereon, movable cutting elements carried by said mandrel means and operable by said cam block upon rotation of the mandrel means relative to the cam block, said cutting elements mounted in a normally radially retracted position and moved radially outward by the cam block upon rotational movement of the cutting elements relative to the cam block, and clutch means between the cam block and body member operable by said spring means to hold the cam block stationary during the rotation of said cutting elements.

4. An inside cutting tool for severing a tubular object, comprising a body, a mandrel of a size to be disposed within the upper portion of said body and reciprocable therein, clamping means for anchoring the body in the tubular object, resilient means constantly urging the mandrel in one direction toward the body, a plurality of cutting elements pivotally carried by said mandrel in a normally radially retracted position, cam means rotatably disposed on said mandrel adapted to radially extend said cutting elements upon relative rotation thereof in one direction on the mandrel, and resiliently actuated clutch means between the cam means and the body for controlling said relative rotation of said cam means so that the cam means will rotate relative to the cutting elements until the cutting elements have moved radially outwardly into contact with the tubular object whereby the cutting elements and the cam means will rotate in unison for severing the tubular object.

5. An inside cutting tool for severing a tubular object, comprising a body, a mandrel of a size to be disposed within the upper portion of said body and reciprocable therein, resilient means constantly urging the mandrel in one direction toward the body, a plurality of cutting elements pivotally carried by said mandrel, cam means rotatably disposed on said mandrel adapted to radially extend said said cutting elements upon relative rotation thereof in one direction on the mandrel, a clamping member carried on the body below said cam means adapted to engage the inner walls of said object, cooperating clutch means carried by said cam means and said body adapted to impose a drag on said cam means during rotation of the mandrel and provide said relative rotation of said cam means until the cutting elements are moved into contact with the inner wall of the tubular object whereby the cutting elements and the cam means rotate in unison for severing the tubular object, and said resilient means constantly urging said clutch means into engagement.

6. An inside cutter for severing tubular objects, comprising an elongated sectional body of a size to be inserted in said object, said body sections being relatively rotatable, clamping means provided on the first of said body sections for securing the said body section to the inner wall of the tubular object, resilient means provided on the second body section for urging of said second body section toward the first body section, a plurality of cutting members pivotally secured on the second body section in a normally retracted position, a cam block rotatably secured on the second body section facing the first body section, means cooperating with the cutting members to cause a radially outward movement thereof upon relative movement between the cam block and the second body section, clutch means between the adjacent faces of the cam block and the first body section whereby the second body section may rotate independently of the first body, said resilient means causing the clutch means to prevent rotation of the cam block until the cutting members have moved radially outward whereupon the cam block and second body section rotate in unison for severing of the tubular object.

References Cited in the file of this patent

UNITED STATES PATENTS

| 1,728,069 | Meiser | Sept. 10, 1929 |
| 1,952,652 | Brannon | Mar. 27, 1934 |
| 2,200,172 | Howard | May 7, 1940 |
| 2,202,986 | Ellis | June 4, 1940 |